(12) United States Patent
Ren et al.

(10) Patent No.: US 9,817,734 B2
(45) Date of Patent: Nov. 14, 2017

(54) VIRTUAL MACHINE RECOVERY ON NON-SHARED STORAGE IN A SINGLE VIRTUAL INFRASTRUCTURE MANAGEMENT INSTANCE

(71) Applicant: VMware, Inc., Palo Alto, CA (US)

(72) Inventors: Joanne Ren, Cupertino, CA (US); Keith Farkas, San Carlos, CA (US); Mike Zucca, Palo Alto, CA (US); Parth Shah, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 179 days.

(21) Appl. No.: 14/753,817

(22) Filed: Jun. 29, 2015

(65) Prior Publication Data
US 2016/0378622 A1 Dec. 29, 2016

(51) Int. Cl.
| | |
|---|---|
| *G06F 11/20* | (2006.01) |
| *G06F 11/00* | (2006.01) |
| *G06F 11/14* | (2006.01) |
| *G06F 11/30* | (2006.01) |
| *G06F 11/16* | (2006.01) |
| *G06F 11/07* | (2006.01) |

(52) U.S. Cl.
CPC ............ *G06F 11/203* (2013.01); *G06F 11/00* (2013.01); *G06F 11/0712* (2013.01); *G06F 11/1484* (2013.01); *G06F 11/1658* (2013.01); *G06F 11/2023* (2013.01); *G06F 11/301* (2013.01); *G06F 2201/815* (2013.01); *G06F 2201/84* (2013.01)

(58) Field of Classification Search
CPC ............ G06F 11/0712; G06F 11/1484; G06F 11/2023; G06F 11/301; G06F 11/203; G06F 11/1658
See application file for complete search history.

(56) References Cited

U.S. PATENT DOCUMENTS

| | | | |
|---|---|---|---|
| 7,203,944 B1 * | 4/2007 | van Rietschote | ... G06F 9/45533 718/1 |
| 7,533,229 B1 * | 5/2009 | van Rietschote | ... G06F 11/1438 711/161 |

(Continued)

OTHER PUBLICATIONS

VMware Inc, "vSphere Availability," 2009, pp. 1-56, VMware Inc., Palo Alto, CA.

(Continued)

*Primary Examiner* — Joseph Kudirka
*Assistant Examiner* — Paul Contino (57) ABSTRACT

Techniques for enabling virtual machine (VM) recovery on non-shared storage in a single virtual infrastructure management server (VIMS) instance are provided. In one set of embodiments, a VIMS instance can receive an indication that a VM in a first cluster of the VIMS instance has failed, and can determine whether the VM's files were being replicated to a storage component of the VIMS instance at the time of the VM's failure. If the VM's files were being replicated at the time of the failure, the VIMS instance can search for and identify a cluster of the VIMS instance and a host system within the cluster that (1) are compatible with the VM, and (2) have access to the storage component. The VIMS instance can then cause the VM to be restarted on the identified host system of the identified cluster.

18 Claims, 8 Drawing Sheets

(56) References Cited

U.S. PATENT DOCUMENTS

| | | | | |
|---|---|---|---|---|
| 8,407,702 | B2* | 3/2013 | Ikegaya | G06F 9/455 718/1 |
| 8,443,367 | B1* | 5/2013 | Taylor | G06F 9/52 718/1 |
| 8,510,590 | B2* | 8/2013 | Ji | G06F 11/1438 714/3 |
| 8,910,160 | B1* | 12/2014 | Patwardhan | G06F 9/4856 718/1 |
| 8,924,967 | B2* | 12/2014 | Nelson | G06F 9/45533 709/224 |
| 9,183,101 | B2* | 11/2015 | Gondi | G06F 11/2033 |
| 9,213,572 | B2* | 12/2015 | Farkas | G06F 9/485 |
| 9,372,726 | B2* | 6/2016 | Gopalan | G06F 9/4856 |
| 9,405,642 | B2* | 8/2016 | Tsirkin | G06F 11/203 |
| 9,483,352 | B2* | 11/2016 | Thiele | G06F 9/45533 |
| 9,558,070 | B2* | 1/2017 | Nelson | G06F 9/45533 |
| 2002/0188711 | A1* | 12/2002 | Meyer | G06F 3/0605 709/223 |
| 2003/0018927 | A1* | 1/2003 | Gadir | G06F 11/2005 714/4.11 |
| 2007/0043860 | A1* | 2/2007 | Pabari | G06F 9/5072 709/224 |
| 2008/0189468 | A1* | 8/2008 | Schmidt | G06F 11/203 711/6 |
| 2008/0189700 | A1* | 8/2008 | Schmidt | G06F 11/203 718/1 |
| 2011/0214005 | A1* | 9/2011 | Biran | G06F 11/008 714/1 |
| 2011/0231696 | A1* | 9/2011 | Ji | G06F 11/1438 714/3 |
| 2012/0137293 | A1* | 5/2012 | Bozek | G06F 9/5077 718/1 |
| 2012/0278801 | A1* | 11/2012 | Nelson | G06F 9/45533 718/1 |
| 2012/0311576 | A1* | 12/2012 | Shu | G06F 9/45558 718/1 |
| 2013/0091335 | A1* | 4/2013 | Mulcahy | G06F 11/2038 711/163 |
| 2013/0297964 | A1* | 11/2013 | Hegdal | G06F 11/0712 714/2 |
| 2014/0059375 | A1* | 2/2014 | McElhoe | G06F 11/1484 714/4.1 |
| 2014/0059392 | A1* | 2/2014 | Ren | G06F 11/301 714/47.1 |
| 2014/0165063 | A1* | 6/2014 | Shiva | G06F 9/45533 718/1 |
| 2014/0281700 | A1* | 9/2014 | Nagesharao | G06F 11/1415 714/15 |
| 2015/0095692 | A1* | 4/2015 | Thiele | G06F 9/45533 714/6.11 |
| 2015/0146716 | A1* | 5/2015 | Olivier | H04L 65/1016 370/352 |
| 2015/0154046 | A1* | 6/2015 | Farkas | G06F 9/485 718/1 |
| 2015/0212910 | A1* | 7/2015 | Gondi | G06F 11/2033 714/6.3 |
| 2015/0324216 | A1* | 11/2015 | Sizemore | G06F 9/45558 718/1 |
| 2015/0324217 | A1* | 11/2015 | Shilmover | G06F 9/45558 718/1 |
| 2015/0324227 | A1* | 11/2015 | Sizemore | G06F 9/48 718/1 |
| 2015/0370659 | A1* | 12/2015 | Pershin | G06F 11/203 714/4.11 |
| 2015/0370660 | A1* | 12/2015 | Pershin | G06F 11/203 714/4.11 |
| 2016/0378622 | A1* | 12/2016 | Ren | G06F 11/203 714/4.11 |

OTHER PUBLICATIONS

Hunter, Jeff, "VMware vSphere Replication 6.0", Technical White Paper, Feb. 2015, pp. 1-12, VMware Inc, Palo Alto, CA.

VMware Inc, "Site Recovery Manager Administration", 2008, pp. 1-130, VMware Inc., Palo Alto, CA.

\* cited by examiner

VIRTUAL MACHINE RECOVERY ON NON-SHARED STORAGE IN A SINGLE VIRTUAL INFRASTRUCTURE MANAGEMENT INSTANCE

BACKGROUND

Virtual machine high availability, also known as "HA," is a technology that minimizes unplanned virtual machine (VM) downtime by monitoring for and detecting failures that bring down VMs and orchestrating recovery of those VMs in response to the failures. An exemplary HA design is described in commonly-assigned U.S. Pat. No. 8,924,967, issued Dec. 30, 2014, entitled "Maintaining High Availability of a Group of Virtual Machines Using Heartbeat Messages."

One limitation with current HA designs (collectively referred to herein as "traditional HA") is that they are generally constrained to operating within the context of a single "cluster," where a cluster is a user-defined group of host systems that are managed by a common instance of a virtual infrastructure management server, or "VIMS." There are a couple of reasons for this limitation. First, in traditional HA, an HA agent is installed on each host system that is part of an HA-enabled cluster, and these agents collaborate with each other to perform failure monitoring, detection, and VM recovery (i.e., failover) entirely within the confines of the cluster. There is no structured way for the HA agents in one cluster to communicate or collaborate with HA agents in a different cluster, regardless of whether the clusters are managed by the same VIMS instance.

Second, traditional HA is generally reliant on shared storage—in other words, it requires that all host systems in a HA fault domain have access to the same storage devices and/or logical storage volumes (e.g., datastores) for retrieving VM files. This requirement arises out of the fact that traditional HA only relocates VMs between different host systems in the case of a failure; traditional HA does not move or replicate the VMs' persistent data between different storage devices/datastores. Accordingly, in a scenario where a VM is failed over from a first host system H1 to a second host system H2, H2 needs to have access to the same storage as H1 in order to read and write the VM's files. This need for shared storage is usually not an issue within a single cluster, but can be problematic in multi-cluster deployments because such deployments typically assign different storage to each cluster for performance and/or other reasons.

The foregoing means that traditional HA cannot be used to orchestrate VM recovery across different clusters that make use of non-shared storage. There are certain existing technologies, such as datacenter disaster recovery solutions, that are capable of failing over VMs from one cluster managed by one VIMS instance (at, e.g., a first datacenter) to another cluster managed by another VIMS instance (at, e.g., a second datacenter). However, these disaster recovery solutions are specifically designed for deployments with multiple VIMS instances, and thus do not address the need of enabling cross-cluster VM recovery in a single VIMS instance.

This gap in functionality is a pain point for organizations that deploy only one VIMS instance, but wish to failover VMs across clusters that may use non-shared storage in that one instance. For example, some organizations do not want the additional complexity and costs of deploying a second VIMS instance. This gap is also problematic for organizations that have multiple VIMS instances at geographically distant locations, and prefer that an attempt be made to restart a failed VM locally (i.e., within or across clusters in a VIMS instance at a single geographic location) if possible.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for enabling, within a single VIMS instance, VM recovery across different clusters of the instance that may use non-shared storage. In some cases, these techniques may also be used to enable VM recovery within a single cluster if more than one datastore is in use in the cluster; however, the embodiments described herein generally focus on applying the techniques in a multi-cluster environment. At a high level, these techniques involve implementing a centralized failover engine in the VIMS instance that interacts with existing HA components in each cluster, as well as with existing components that perform replication of VM data (referred to herein as "VR," which is described below). By leveraging these HA and VR components, the failover engine can automatically failover a VM from a first cluster of the VIMS instance to a second cluster of the VIMS instance using a replicated copy of the VM's data (if such replicated data is needed and is available).

For example, in one set of embodiments, the failover engine can be invoked at the time a VM in a particular cluster managed by the VIMS instance (referred to as the "source cluster") has failed and cannot be placed using traditional HA on another host system within that cluster. In response to the invocation, the failover engine can first attempt to find another compatible cluster/host system managed by the VIMS instance that has access to the same storage as the source cluster. If such a cluster/host system can be found, the failover engine can cause the VM to be restarted on the found cluster/host system, such that the restarted VM makes use of the VM's original files.

On the other hand, if a compatible cluster/host system with access to the same storage as the source cluster cannot be found, the failover engine can determine whether the files of the failed VM were being replicated to another host system in a different cluster than the source cluster (referred to as the "replication target cluster") at the time of the failure. If so, the failover engine can interact with one or more of the replication components responsible for that replication process to create a "failover image." In a particular embodiment, the failover image can correspond to a configuration file for the VM that links to the VM's replicated files.

The failover engine can then attempt to find a compatible cluster/host system managed by the VIMS instance that has access to the same storage used by the replication target cluster (i.e., the storage where the VM's replicated files reside). Note that the set of clusters/host systems considered at this point can be different from the set of clusters/host systems considered previously, since the storage holding the VM's replicated files may be accessible by a different group of clusters/host systems within the VIMS instance than the storage holding the VM's original files. Finally, if a compatible cluster/host system with access to the replicated data is found, the failover engine can restart the VM on the found cluster/host system (referred to as the "HA target cluster/host system") using the failover image, such that the restarted VM makes use of the VM's replicated files.

One challenge with the cross-cluster VM recovery workflow described above is that, in some failure scenarios, a "split-brain" situation may arise where a failed VM is inadvertently restarted in both the source cluster (using the original VM data) and the HA target cluster (using the replicated VM data). Such a split-brain situation can lead to data inconsistencies and other erratic behavior from the perspective of the VM's clients. To address this, in certain embodiments, the replication components that handle replication at the source and replication target clusters can be enhanced to support a two-phase commit protocol for failover image creation. As explained below, this two-phase commit protocol can ensure that only a single instance of the VM is powered-on at a given time (as long as there is no network partition between the source cluster and the replication target cluster).

The foregoing and other aspects of the present disclosure are described in further detail in the sections that follow.

2. System Environment

Figure 1A:
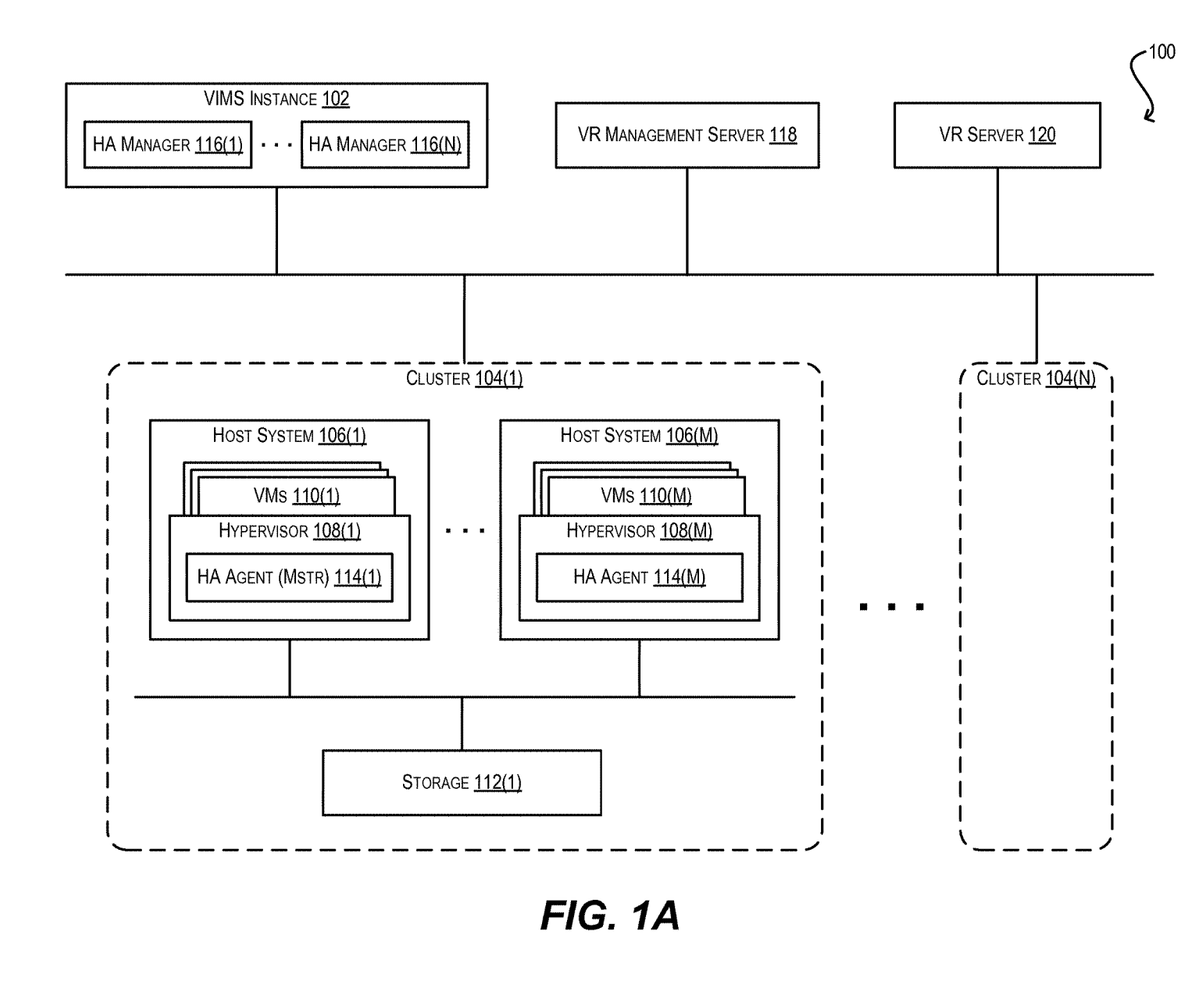
FIG. 1A depicts a system environment that supports traditional HA and VM replication (VR).

FIG. 1A depicts an exemplary system environment 100 in which embodiments of the present disclosure may be implemented. As shown, system environment 100 includes a VIMS instance 102 that is communicatively coupled with a number of clusters 104(1)-(N). Each cluster 104, in turn, includes a number of host systems 106(1)-(M) (comprising hypervisors 108(1)-(M) and VMs 110(1)-(M)) that represent the compute resources of the cluster, and a storage component 112 that represents the storage resources of the cluster. In one set of embodiments, each storage component 112 (which can correspond to one or more physical storage devices or one or more logical storage volumes) may only accessible by the host systems of its associated cluster, and thus can be considered "shared" within the cluster but "non-shared" across cluster boundaries. In other embodiments, one or more of storage components 112(1)-(N) may be accessible by multiple clusters 104(1)-(N).

VIMS instance 102 is a software and/or hardware-based component that provides a centralized platform for managing clusters 104(1)-(N) and their constituent host systems/hypervisors/VMs. For example, VIMS instance 102 can allow users to define the composition/properties of each cluster 104, configure/monitor the operation of hypervisors 108, and manage the lifecycles of VMs 110. VIMS instance 102 can also automate certain inter-cluster and intra-cluster virtualization features, such as live VM migration, dynamic resource allocation, and so on. In a particular embodiment, VIMS instance 102 can be implemented using VMware, Inc.'s vCenter Server.

Hypervisors 108 of host systems 106 are software-based components that provide execution environments in which their associated VMs 110 can run. In one embodiment, hypervisors 108 can interact directly with the hardware platforms of host systems 106 without an intervening host operating system. In this embodiment, each hypervisor 108 can include a kernel (not shown) that manages VM use of the various hardware devices of the host system. An example of such a "bare metal" hypervisor is VMware Inc.'s ESXi Hypervisor. In an alternative embodiment, hypervisors 108 can be part of a "hosted" configuration in which the hypervisors run on top of a host operating system (not shown). In this embodiment, hypervisors 108 can rely on the host operating system for physical resource management of hardware devices. One of ordinary skill in the art will recognize various modifications and alternatives for the design and configuration of hypervisors 108.

In the example of FIG. 1A, system environment 100 is configured to support replication of VM data across clusters 104(1)-(N) (referred to herein as "VR"). To that end, system environment 100 includes a VR management server 118 and a VR server 120 that are connected to VIMS instance 102 and clusters 104(1)-(N). Generally speaking, VR management server 118 and VR server 120 can work in concert with each other (and with other VR components explained below) to facilitate the copying of persistent data for a given VM (known as a "protected VM") from a source cluster of VIMS instance 102 to a replication target cluster of VIMS instance 102 in an asynchronous fashion.

Figure 1B:
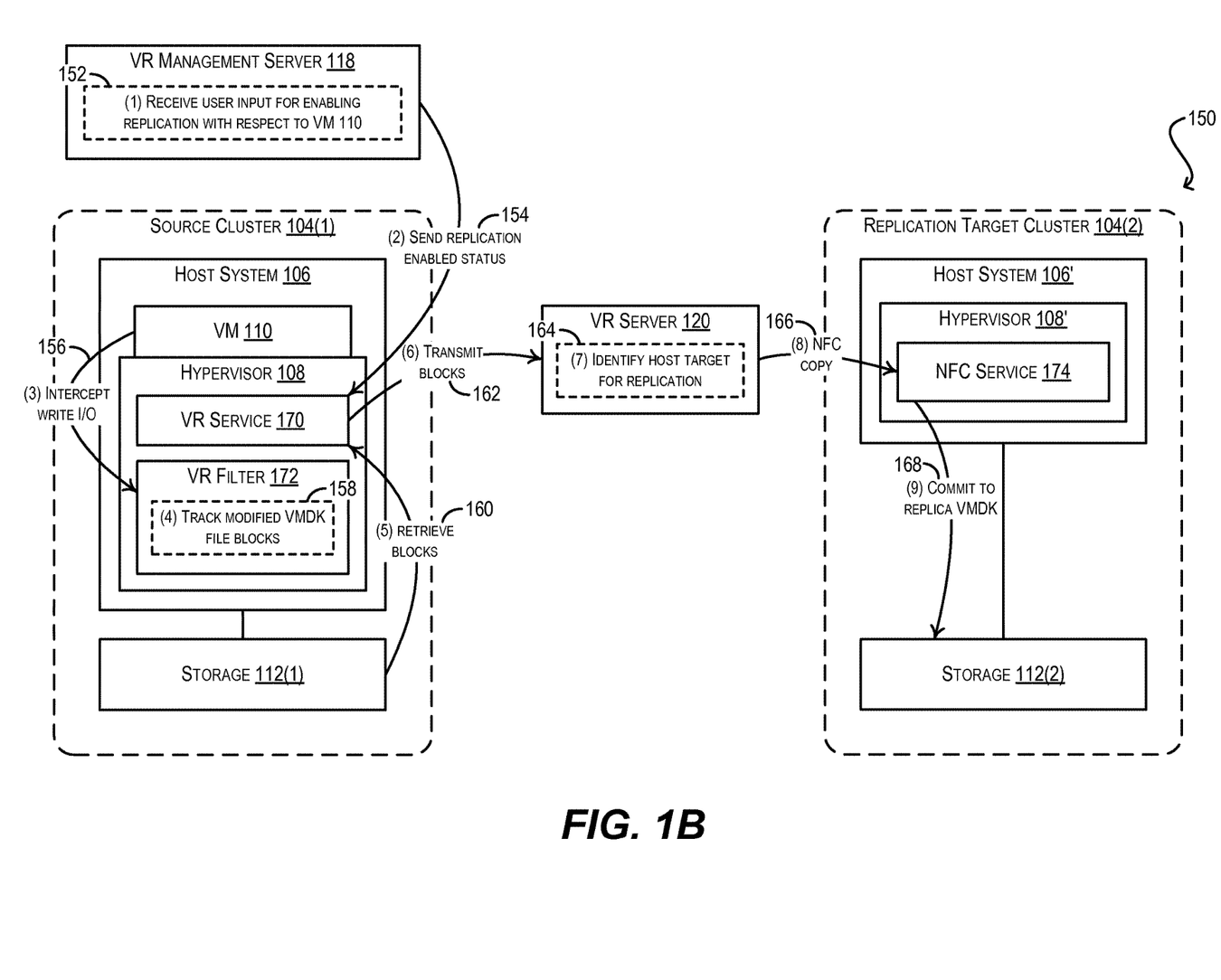
FIG. 1B depicts a typical VR deployment and replication workflow.

To clarify how this replication process may work, FIG. 1B illustrates a typical VR deployment and workflow 150 with respect to clusters 104(1) and 104(2) of FIG. 1A according to an embodiment. In FIG. 1B, cluster 104(1) is the source cluster for replication, cluster 104(2) is the replication target cluster, and VM 110 in source cluster 104(1) is the protected VM whose data is being replicated.

Starting with steps (1) and (2) of workflow 150 (reference numerals 152 and 154), a user first enables replication for protected VM 110 via VR management server 118, which causes VR management server 118 to communicate a "replication enabled" status for the VM to a VR service 170 running in hypervisor 108 of host system 106. As part of step (1), the user specifies a replication target and recovery point objective (RPO) for protected VM 110. The replication target identifies a storage location in replication target cluster 104(2) where the VM's data will be sent to (e.g., a virtual disk on storage component 116(2) of replication target cluster 104(2)). The RPO identifies a recurring time interval at which modified VM data should be sent over to the replication target (e.g., every 5 minutes, 10 minutes, etc.).

At steps (3) and (4) (reference numerals 156 and 158), during runtime of protected VM 110, a VR filter 172 executing within hypervisor 108 intercepts, from the VM, I/O writes destined for a virtual disk stored on storage component 112(1), and keeps track of the unique file blocks that are modified by the writes. VR filter 172 performs this tracking for the period of time identified by the protected VM's RPO.

At steps (5) and (6) (reference numerals 160 and 162), once the time interval corresponding to the RPO is close to being passed, VR service 170 retrieves all of the modified virtual disk file blocks from storage component 112(1) and transmits the blocks to VR server 120. Upon receiving the modified file blocks, VR server 120 identifies a host system 106' in replication target cluster 104(2) that is capable of writing the file data to storage (step (7), reference numeral 164). VR server 120 then copies, via network file copy (NFC), the modified file blocks to a NFC service 174 running within a hypervisor 108' of identified host system 106' (step (8), reference numeral 166).

Finally, at step (9) (reference numeral 168), NFC service 174 receives the modified file blocks from VR server 120 and commits the blocks to the replication target virtual disk on storage component 112(2), thereby bringing this replica copy up-to-date with the original virtual disk in storage component 112(1) of source cluster 104(1). It should be noted that while steps (7)-(9) are occurring, VR filter 172 and VR service 170 in source cluster 104(1) will begin executing steps (3)-(6) again for the next RPO time period and the entire workflow will repeat. In this way, changes to the protected VM's data will be tracked and replicated to replication target cluster 104(2) on an ongoing basis.

Returning now to FIG. 1A, in addition to supporting cross-cluster replication of VM data, system environment 100 is also configured to support traditional HA. Thus, as shown, an HA agent 114 is installed in the hypervisors/host systems of each cluster 104 to carry out failure monitoring, detection, and VM recovery (in accordance with traditional HA techniques) within the confines of that cluster. One HA agent per cluster (identified via the "(MSTR)" designation) is the "master" HA agent and is specifically configured to orchestrate VM recovery in that cluster. Further, a HA manager 116 is installed in VIMS instance 102 for each cluster 104. HA managers 116(1)-(N) are responsible for handling certain intra-cluster tasks pertaining to traditional HA, such as dynamically reallocating resources within their associated clusters to facilitate VM placement.

As noted in the Background section, one limitation with traditional HA is that it does not allow for the failover of VMs across different clusters that are managed by (i.e., are "in") a single VIMS instance. This is because traditional HA does not provide a structured way for HA agents in one cluster to communicate/collaborate with HA agents in another cluster, and requires that all of the host systems in a given HA fault domain have access to the same shared storage. Certain disaster recovery solutions can orchestrate VM recovery across different clusters in different VIMS instances (e.g., different datacenters), but still fail enable such cross-cluster recovery in the context of a single VIMS instance.

Figure 2:
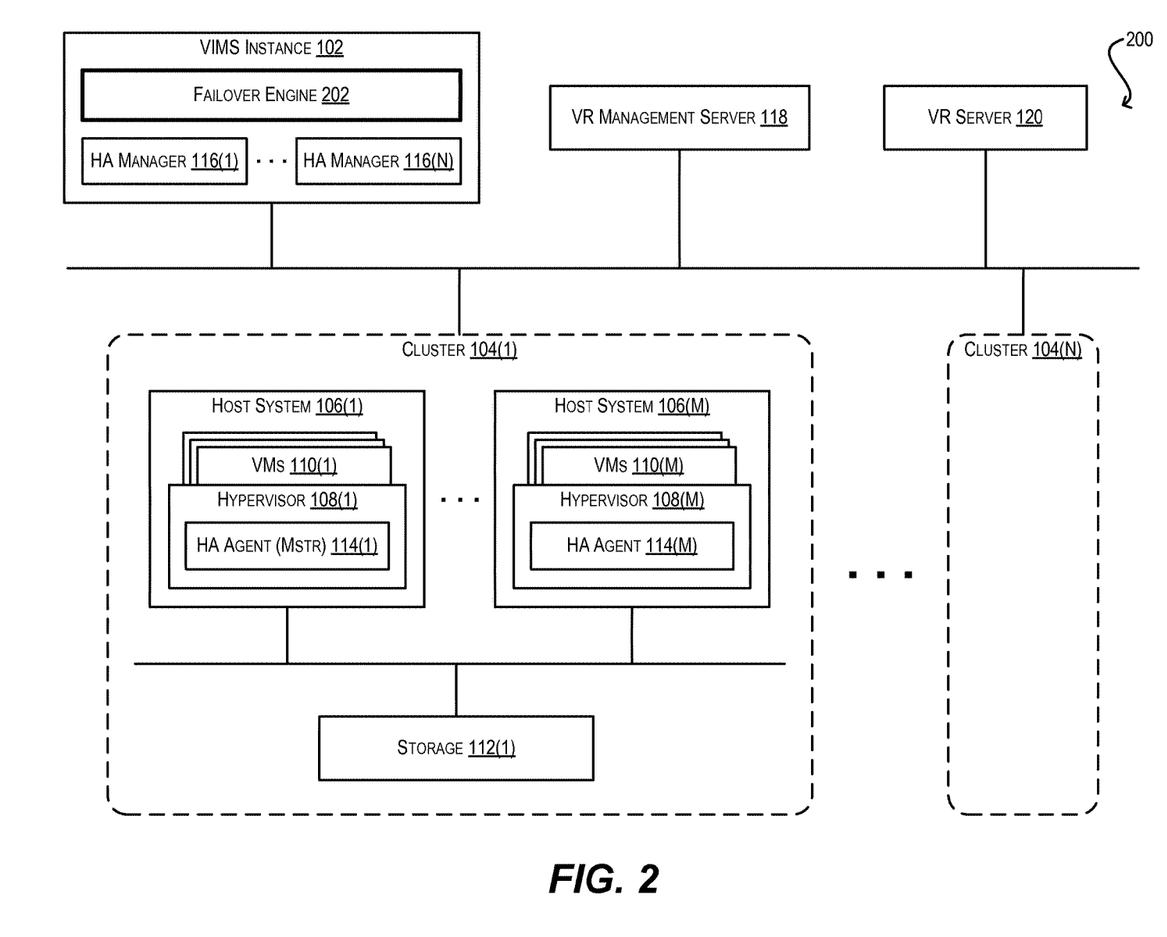
FIG. 2 depicts a system environment that supports cross-cluster VM recovery on non-shared storage in a single VIMS instance according to an embodiment.

To address this gap, FIG. 2 depicts a modified version of system environment 100 (identified as system environment 200) that includes a failover engine 202 within VIMS instance 102. As detailed in the sections that follow, failover engine 202 can interoperate with the existing HA and VR components of system environment 200 to centrally coordinate the failover of a VM from one cluster of VIMS instance 102 to another cluster of VIMS instance 102 using a replicated copy of the VM's data (if such replicated data is needed and is available). In this way, failover engine 202 can enable cross-cluster VM recovery in a single VIMS deployment, even if certain clusters of the deployment do not have access to shared storage.

It should be appreciated that FIGS. 1A, 1B, and 2 are illustrative and not intended to limit the embodiments disclosed herein. For example, the various entities shown in these figures may be arranged according to other configurations and/or may include subcomponents or functions that have not been specifically described. One of ordinary skill in the art will recognize many variations, modifications, and alternatives.

3. VM Recovery Workflow

Figure 3A:
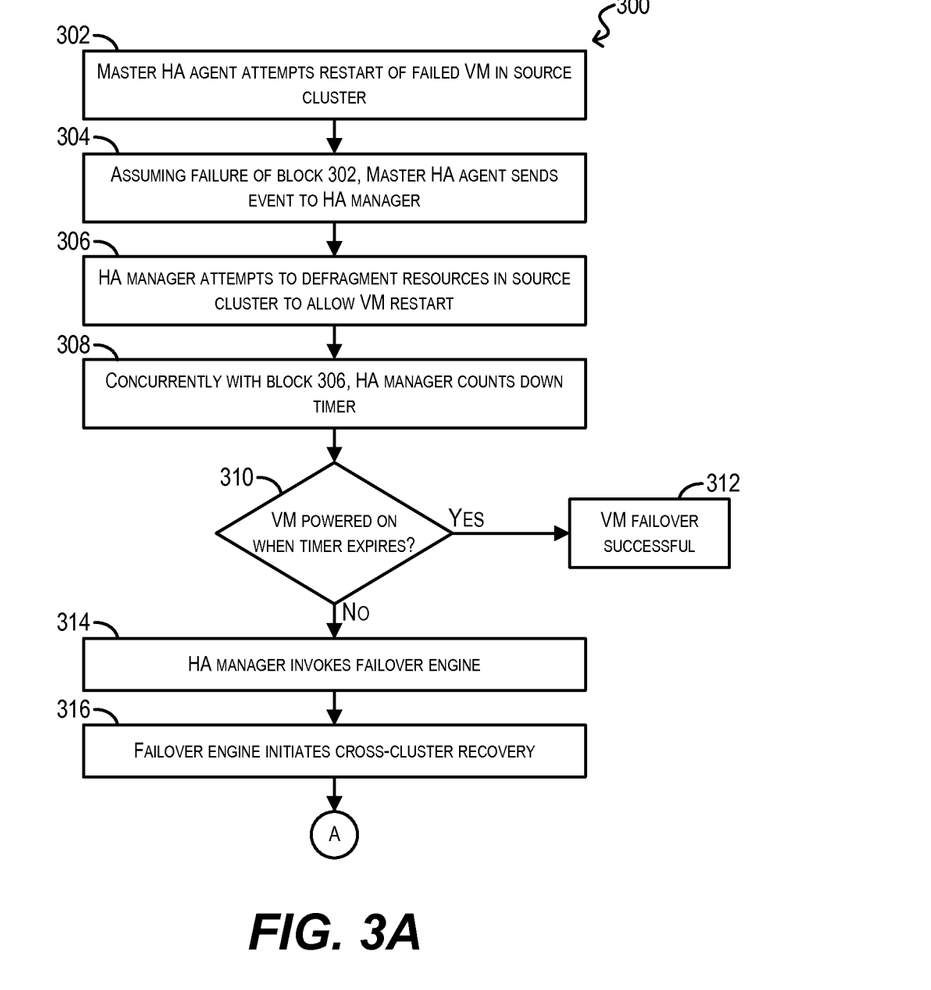
FIGS. 3A and 3B depict an end-to-end VM recovery workflow (comprising cross-cluster recovery) in the system environment of FIG. 2 according to an embodiment.
Figure 3B:
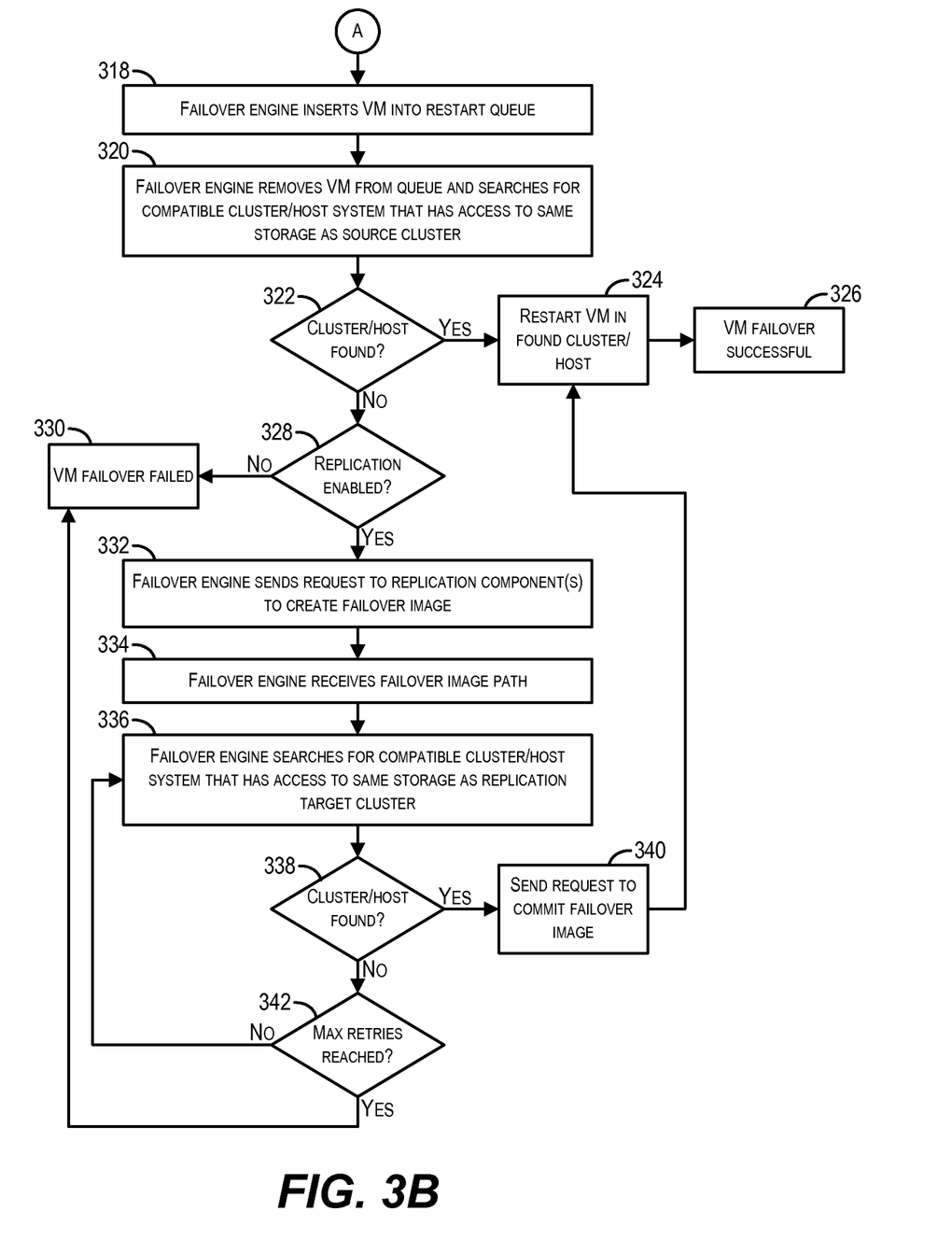

FIGS. 3A and 3B depict an end-to-end VM recovery workflow 300 that may be executed in the context of system environment 200 of FIG. 2, and in particular illustrates how failover engine 202 can orchestrate VM recovery across the various clusters of VIMS instance 102 without requiring inter-cluster shared storage according to an embodiment.

Starting with block 302 of FIG. 3A, at the time a VM 110 has failed in a given cluster (i.e., source cluster) 104(X) of VIMS instance 102, the master HA agent of source cluster 104(X) can first attempt to restart VM 110 on another host system in the same cluster. The master HA agent can use traditional HA techniques to attempt this intra-cluster restart.

At block 304, assuming insufficient compute resources are available for restarting VM 110 in source cluster 104(X), the master HA agent can send an event to the source cluster's corresponding HA manager 116(X) running in VIMS instance 102. In response to the event, HA manager 116(X) can attempt to defragment the source cluster's compute resources, thereby creating larger blocks of unallocated capacity that will hopefully allow VM 110 to be restarted (block 306). In one embodiment, HA manager 116(X) can perform this defragmentation by invoking an existing component of VIMS instance 102 that is designed to dynamically move VMs across host systems within a cluster based on VM resource demands/constraints, such as VMware Inc.'s Distributed Resource Scheduler (DRS).

Concurrently with block 306, HA manager 116(X) can also count down a timer indicating how long the HA manager should wait for sufficient capacity to become available in source cluster 104(X) via the defragmentation process before initiating cross-cluster recovery (block 308). The length of this timer can be user-configurable.

If, at block 310, VM 110 is powered-on when the timer has expired (indicating that the defragmentation was able to create sufficient compute capacity in source cluster 104(X) for restarting the VM), the failover can be deemed successful (block 312) and workflow 300 can end.

However, if VM 110 is still powered off when the timer expires (indicating that the defragmentation was not able to create sufficient compute capacity for restarting the VM), HA manager 116(X) can invoke failover engine 202 (block 314). Failover engine 202 can then initiate a process for attempting failover of VM 110 to another cluster of VIMS instance 102 that is different from source cluster 104(X) (block 316), which is illustrated in FIG. 3B.

For example, at block 318 of FIG. 3B, failover engine 202 can insert VM 110 into a queue comprising all VMs managed by VIMS instance 102 that are waiting to be failed over across clusters. In certain embodiments, the VMs in the queue can be ranked by a user-defined restart priority, such that VMs with higher restart priorities will be processed for cross-cluster failover before VMs with lower restart priorities.

When it is VM 110's turn to be processed, failover engine 202 can remove the VM from the queue and can search for a cluster and host system managed by VIMS instance 102 that (1) are compatible with VM 110, and (2) have access to the same storage as source cluster 104(X) (i.e., storage component 112(X)) (block 320). Stated another way, failover engine 202 can attempt to find a suitable cluster/host system in VIMS instance 102 that is capable of running VM 110 using the VM's original files. This search logic can be implemented directly within failover engine 102 or in a separate component that is connected to VIMS instance 102, such as VMware Inc.'s VDCS Placement Engine.

It should be noted that the factors for determining whether a given cluster and host system are "compatible" with VM 110 at block 320 can vary depending upon the nature of the deployment and one or more user-defined policies. For instance, in one embodiment, a cluster/host system can be considered compatible if it meets certain compute requirements defined for the VM (e.g., CPU and/or memory requirements). In another embodiment, a cluster/host system can be considered compatible if it meets the VM's compute requirements and is not specifically excluded as a VM failover candidate (via, e.g., a cluster-level "anti-affinity" flag). Examples of clusters that may be excluded via such an anti-affinity flag include the cluster from which the VM originated (e.g., source cluster 104(X)) and clusters which are HA disabled. One of ordinary skill in the art will recognize other potential factors and rules for determining cluster-VM compatibility.

If, at block 322, failover engine 202 finds a compatible cluster/host system that has access to the same storage as source cluster 104(X), failover engine 202 can cause VM 110 to be restarted in that new cluster/host system by, e.g., communicating with the master HA agent in the cluster (block 324). The failover can then be deemed successful (block 326) and workflow 300 can end.

On the other hand, if no such cluster/host system is found, failover engine 202 can proceed to check whether replication is enabled for VM 110 (block 328). In this way, failover engine 202 can determine whether a replicated copy of the VM's files is available to enable failover of the VM to a different cluster/host system that has access to different storage than source cluster 104(X).

If failover engine 202 determines that replication is not enabled, VM 110 cannot be recovered and thus the failover can be deemed a failure (block 330) and workflow 300 can end.

However, if failover engine 202 determines that replication is enabled, the engine can transmit a request to one or more of the VR components responsible for the replication process to create a "failover image" for VM 110, where the failover image is a configuration file (e.g., .vmx file) that links to the VM's replicated files as stored at a replication target cluster 104(Y) (block 332). In a particular embodiment, failover engine 202 can send this "create failover image" request to VR management server 118, which can in turn forward the request to VR server 120. Assuming the request is successfully processed by VR server 120, failover engine 202 can receive a path to the created failover image (block 334).

Upon receiving the failover image path, failover engine 202 can execute a second search to find a cluster and host system managed by VIMS instance 102 that are (1) compatible with VM 110, and (2) have access to the storage where the VM's replicated files reside (i.e., storage component 112(Y) in replication target cluster 104(Y)) (block 336). In one embodiment, as part of this second search, failover engine 202 (or the component implementing the search logic) can consider the host systems in replication target cluster 104(Y) first as potential candidates.

If, at block 338, failover engine 202 finds a compatible cluster/host system that has access to the replicated VM data, failover engine 202 can send a request to VR management server 118/VR server 120 to "commit" the failover image, which can cause the replication configuration for VM 110 to be removed (block 340). Failover engine 202 can then cause the VM to be restarted on the found host system of the found cluster (i.e., HA target cluster 104(Z)) (block 324), which renders the failover successful (block 326) and ends workflow 300. As part of block 324 in this scenario, failover engine 202 can specifically cause the VM to be restarted in HA target cluster 104(Z) using the configuration information specified in the created failover image. In this way, the restarted VM will access the replicated copy of the VM's files in replication target cluster 104(Y), rather than the original VM files in source cluster 104(X). Note that, in some instances, HA target cluster 104(Z) may be the same as replication target cluster 104(Y). Once the VM is powered-on in HA target cluster 104(Z), a user can choose to enable replication again on the restarted VM (via, e.g., VR management server 118) and can use source cluster 104(X), or any other cluster of VIMS instance 102, as the new target cluster for the replication.

On the other hand, if no compatible cluster/host system with access to the replicated VM data is found, failover engine 202 can retry the search performed at block 336 for a preconfigured number of times. Finally, once the maximum number of retries is reached without finding a suitable cluster/host system (block 342), failover engine 202 can conclude that the failover has failed (block 330) and workflow 300 can end.

It should be appreciated that workflow 300 of FIGS. 3A and 3B is illustrative and various modifications are possible. For example, in one alternative embodiment (not shown), failover engine 202 can invoke a user-defined policy prior to block 332 in order to determine whether it should automatically attempt cross-cluster VM failover using replicated data. If the user-defined policy indicates that automatic failover is allowed, failover engine 202 can proceed with block 332 and the remaining steps shown in FIG. 3B. However, if the user-defined policy indicates that automatic failover is not allowed, failover engine 202 can abort the failover process or request manual user approval/intervention. This level of control can be useful because, in some cases, an automatic failover using replicated data can lead to data loss (due to the asynchronous nature of the replication process described with respect to FIG. 1B). Accordingly, the user-defined policy can be set to disable automatic failover for those applications/VMs that cannot tolerate any data loss.

As another example, although workflow 300 describes the interoperation of failover engine 202 with a specific replication mechanism as implemented by VR management server 118 and VR server 120, in alternative embodiments failover engine 202 can leverage other types of replication mechanisms for facilitating cross-cluster VM recovery.

As yet another example, although workflow 300 is designed to enable cross-cluster VM recovery in a multi-cluster environment, in certain embodiments workflow 300 can also be used to enable VM recovery within a single cluster. In these embodiments, blocks 320 and 322 may be omitted if the VIMS instance manages only one cluster. Further, as part of block 336, failover engine 202 may look for other host systems in the original (i.e., source) cluster as potential failover targets for the failed VM, since the VM's data may be replicated to a different storage device/datastore within that same cluster. One of ordinary skill in the art will recognize many variations, modifications, and alternatives.

4. Split-Brain Prevention

As noted previously, one complication with the cross-cluster VM recovery workflow illustrated in FIGS. 3A and 3B is that, in certain failure scenarios, a "split-brain" situation may occur where the failed VM is inadvertently restarted in two locations—the source cluster (using the original VM data) and the HA target cluster (using replicated VM data). For example, consider a scenario in which a network partition prevents all of the host systems in the source cluster from communicating with the VIMS instance. In this case, the failover engine running on the VIMS instance cannot tell whether the source cluster has experienced a total cluster failure (i.e., failure of all host systems) or not, and thus may power-on the failed VM in a different cluster even though one or more host systems in the source cluster are still operational (and thus also power-on the failed VM in the source cluster via traditional HA).

As another example, consider a scenario where all of the host systems in the source cluster initially go down, but then come back up while the failover engine is in the process of executing VM recovery workflow 300. In this case, a race condition may occur between the master HA agent in the source cluster and the failover engine, where the failover engine thinks the failed VM is powered off and attempts to restart the VM in a different cluster at approximately the same time that the master HA agent attempts to restart the VM in the source cluster.

To prevent split-brain due to the foregoing (and other similar) scenarios, in certain embodiments the VR service and VR server components shown in the deployment of FIG. 1B can be enhanced to allow the VR service to send, and the VR server to monitor, the power state of a protected VM (i.e., whether the protected VM is currently powered-on or powered off) during the replication process. This power state information is provided by the VR service in addition to a "host heartbeat" that is already sent by the VR service to the VR server at regular intervals.

The VR server can then leverage the power state information and the host heartbeat within a two-phase commit protocol that is implemented at the time of failover image creation (i.e., during block 334 of FIG. 3B). Using this two-phase commit protocol, the VR server—with the cooperation of the host systems in a source cluster—can generally ensure that it creates and commits a failover image for a VM only if the VM has not been powered-on (and is not in the process of being powered-on) within the source cluster via traditional HA.

Figure 4:
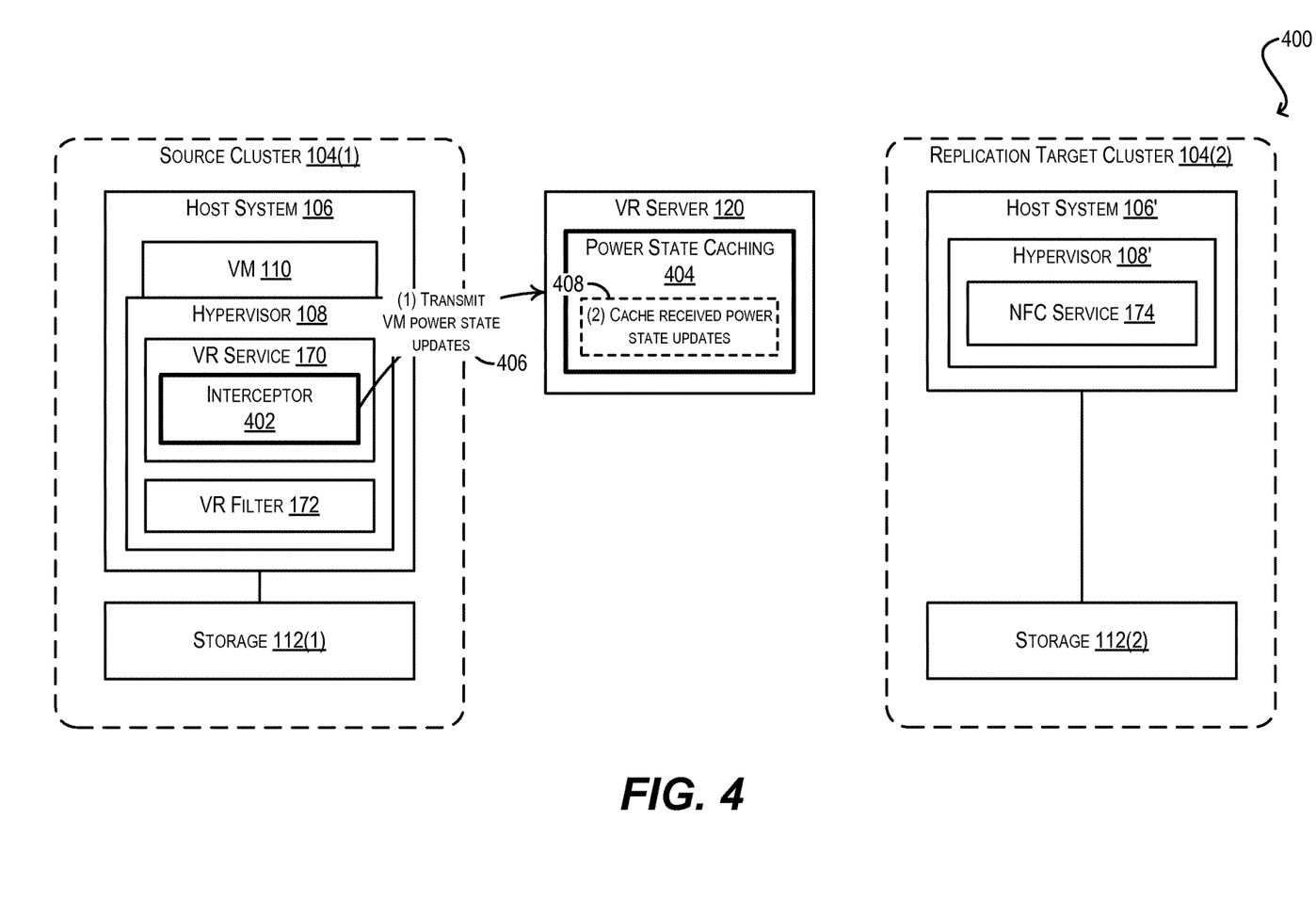
FIG. 4 depicts a modified version of the VR deployment of FIG. 1B according to an embodiment.

FIG. 4 depicts a modified version (400) of the VR deployment of FIG. 1B that supports the transmission of power state information from VR service 170 at source cluster 104(1) to VR server 120 according to an embodiment. As shown in FIG. 4, VR service 170 now includes an interceptor module 402 that is triggered by changes in the power state of VM 110 (e.g., power-on, power-off, or provisioning changes such as VM migration) during the replication process for VM 110. Upon being triggered, interceptor module 402 can cause VR service 170 to send the current power state of VM 110 to VR server 120 (step (1), reference numeral 406).

Further, VR server 120 now includes a power state caching module 404. In various embodiments, power state caching module 404 can receive the power state updates sent by VR service 170 for VM 110 (and for other protected VMs running on host system 106 that are being replicated to replication target cluster 104(2)). Power state caching module 404 can then store these power state updates, along with the host heartbeat that is sent by VR service 170 at regular intervals, in a local cache (step (2), reference numeral 408). In this way, VR server 120 can monitor, on an on-going basis, whether the host system 106 at source cluster 104(1) is available/running (via the host heartbeat) and whether protected VM 110 is on or off (via the power state updates).

Figure 5:
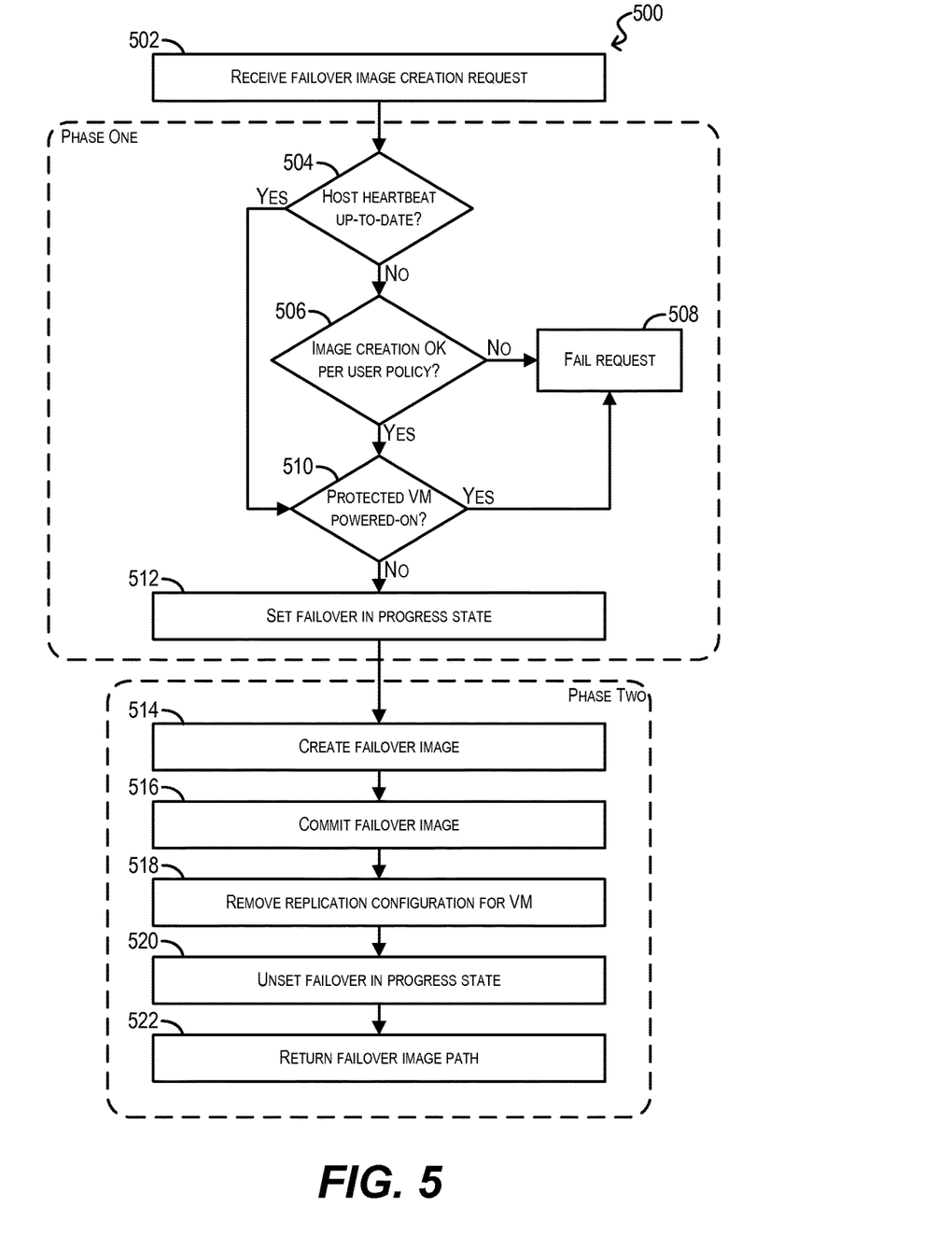
FIG. 5 depicts a workflow for implementing a two-phase commit protocol at the time of failover image creation according to an embodiment.

With the power state feature of FIG. 4 in mind, FIG. 5 depicts a workflow 500 that can be performed by a VR server at a replication target cluster (e.g., VR server 120 of FIG. 4) for implementing a two-phase commit protocol during failover image creation for a protected VM (e.g., VM 110) to avoid split-brain according to an embodiment.

Starting with block 502 of workflow 500, VR server 120 can receive a request for creating a failover image for protected VM 110. In one embodiment, this "create failover image" request can correspond to the request sent by failover engine 202 at block 334 of VM recovery workflow 300.

Upon receiving the request, VR server 120 can enter a first phase of the two-phase commit protocol, which involves first checking whether the host heartbeat from host system 106 of source cluster 104(1) is up-to-date (block 504). If the host heartbeat is not up-to-date (e.g., the host heartbeat is older than expected), this means that VR server 120 has become partitioned from source cluster 102(1) (and thus, VR server 120 does not know for sure whether host system 106 is still up or not). In this situation, VR server 120 can check a user-defined policy to determine how to proceed (block 506), since continuing with failover image creation at this point may lead to split-brain. If the user-defined policy indicates that failover image creation should not continue, the request can be failed (block 508) and workflow 500 can end.

However, if the user-defined policy indicates that failover image creation should continue (or if the host heartbeat is determined to be up-to-date at block 504), VR server 120 can move on to checking whether protected VM 110 is currently powered-on in source cluster 104(1) (per the power state information cached via power state caching module 404) (block 510). If the VM is powered-on, VR server 120 can conclude that it should fail the request to prevent split-brain (block 508) and workflow 500 can end.

On the other hand, if protected VM 110 is not currently powered-on, VR server 120 can set a "failover in progress" state for the VM (block 512). As described with respect to FIG. 6 below, the host systems in source cluster 106(1) can use this state to coordinate their HA failover actions with failover engine 202 and thereby avoid a race condition for restarting VM 110. VR server 120 can then proceed with phase two of the protocol.

In phase two, VR server 120 can create and commit the failover image (blocks 514 and 516). Although not shown, if there are any exceptions/errors during these steps, VR server 120 can automatically revert the failover image and fail the request. Once the failover image has been successfully created and committed, VR server 120 can remove the replication configuration for VM 110 (thereby disabling replication for that VM) and can unset the "failover in progress" state (blocks 518 and 520). Finally, at block 522, VR server 120 can return the path to the failover image and workflow 500 can end.

Figure 6:
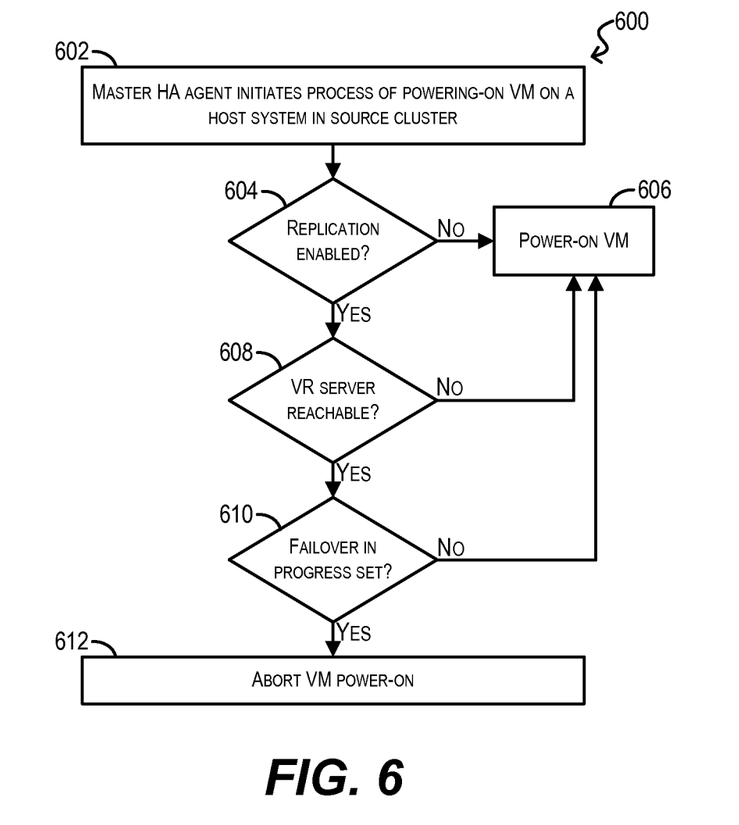
FIG. 6 depicts a workflow for powering-on a VM in a source cluster according to an embodiment.

FIG. 6 depicts a workflow 600 that can be performed by a host system of source cluster 104(1), concurrently with the execution of workflows 300 and/or 500 by failover engine 202 and/or VR server 120, at the time of powering-on protected VM 110 via traditional HA according to an embodiment. With workflow 600, the host system can take into account the "failover in progress" state manipulated by VR server 120 and can thereby avoid restarting VM 110 in source cluster 104(1) if the VM's failover image is already in the process of being created/committed.

At block 602, the master HA agent of source cluster 104(1) can initiate the process of restarting/powering-on VM 110 on the designated host system. At block 604, the host system can first check whether replication has been enabled for VM 110 (block 604). If not, the host system can proceed with powering-on the VM (block 606).

If replication has been enabled, the host system then can check whether VR server 120 is reachable (block 608). If not, the host system can proceed with powering-on the VM as above (block 606).

Finally, if VR server 120 is reachable, the host system can check the "failover in progress" state for VM 110 (as set/unset by the VR server in workflow 500) (block 610). If the "failover in progress" state is unset, the host system can proceed with powering-on the VM (block 606). However, if the "failover in process" state is set, the host system can conclude that cross-cluster recovery is currently being performed and thus can abort the VM power-on process (block 612).

It should be appreciated that workflows 500 and 600 of FIGS. 5 and 6 are illustrative and various modifications are possible. For example, in one alternative embodiment (not shown), the host system that performs blocks 604-612 of workflow 600 can first check, prior to block 604, whether the VM power-on process was specifically initiated/orchestrated by the master HA agent of the cluster. If not, the host system can skip these steps entirely during VM power-on, because they are only needed in the context of a HA restart. One of ordinary skill in the art will recognize other variations, modifications, and alternatives.

Certain embodiments described herein involve a hardware abstraction layer on top of a host system (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, VMs are used as an example for the containers and hypervisors as an example for the hardware abstraction layer. Each VM generally includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for enabling virtual machine (VM) recovery on non-shared storage, the method comprising:
   receiving, by a virtual infrastructure management server (VIMS) instance, an indication that a VM in a first cluster of the VIMS instance has failed, wherein one or more files of the VM are stored on a first storage component accessible by host systems in the first cluster;
   searching for a second cluster of the VIMS instance that has access to the first storage component;
   if the second cluster is found, causing the VM to be restarted on a host system in the second cluster; and
   if the second cluster is not found:
      determining, by the VIMS instance, whether the one or more files of the VM were being replicated to a second storage component at the time of the VM's failure, wherein the second storage component is accessible by host systems in one or more third clusters of the VIMS instance but is not accessible by the host systems in the first cluster;
      if the one or more files of the VM were being replicated to the second storage component at the time of the VM's failure, identifying, by the VIMS instance, a host system within the one or more third clusters that is compatible with the VM; and
      causing, by the VIMS instance, the VM to be restarted on the identified host system in the one or more third clusters.

2. The method of claim 1 further comprising, prior to identifying the host system within the one or more third clusters:
   checking a user-defined policy to determine whether automatic recovery of the VM should continue; and
   if the user-defined policy indicates that automatic recovery should not continue, requesting manual user intervention.

3. The method of claim 1 further comprising, prior to identifying the host system within the one or more third clusters:
   sending, to a replication component involved in replicating the one or more files of the VM, a request to create a failover image for the VM, the failover image including one or more links to a replicated copy of the one or more files at the first cluster or the one or more third clusters; and
   in response to the sending, receiving a path to the failover image.

4. The method of claim 3 wherein the VIMS instance causes the VM to be restarted on the identified host system using the failover image.

5. The method of claim 3 wherein, upon receiving the request to create the failover image, the replication component is configured to:
   check whether a host heartbeat associated with a host system in the first cluster on which the VM was running is up-to-date;
   if the host heartbeat is up-to-date, check whether the VM is currently powered-on; and
   if the VM is not currently powered on:
      set a failover-in-progress state for the VM;
      create the failover image; and
      upon successful creation of the failover image, unset the failover-in-progress state.

6. The method of claim 5 wherein the VM is not allowed to be powered-on in the first cluster while the failover-in-progress state is set.

7. A non-transitory computer readable storage medium having stored thereon program code executable by a VIMS instance, the program code embodying a method for enabling VM recovery on non-shared storage, the method comprising:
   receiving an indication that a VM in a first cluster of the VIMS instance has failed, wherein one or more files of the VM are stored on a first storage component accessible by host systems in the first cluster;
   searching for a second cluster of the VIMS instance that has access to the first storage component
   if the second cluster is found, causing the VM to be restarted on a host system in the second cluster; and
   if the second cluster is not found:
      determining whether the one or more files of the VM were being replicated to a second storage component at the time of the VM's failure, wherein the second storage component is accessible by host systems in one or more third clusters of the VIMS instance but is not accessible by the host systems in the first cluster;
      if the one or more files of the VM were being replicated to the second storage component at the time of the VM's failure, identifying a host system within the one or more third clusters that is compatible with the VM; and
      causing the VM to be restarted on the identified host system in the one or more third clusters.

8. The non-transitory computer readable storage medium of claim 7 wherein the method further comprises, prior to identifying the host system within the one or more third clusters:
   checking a user-defined policy to determine whether automatic recovery of the VM should continue; and
   if the user-defined policy indicates that automatic recovery should not continue, requesting manual user intervention.

9. The non-transitory computer readable storage medium of claim 7 wherein the method further comprises, prior to identifying the host system within the one or more third clusters:
   sending, to a replication component involved in replicating the one or more files of the VM, a request to create a failover image for the VM, the failover image including one or more links to a replicated copy of the one or more files; and
   in response to the sending, receiving a path to the failover image.

10. The non-transitory computer readable storage medium of claim 9 wherein the VIMS instance causes the VM to be restarted on the identified host system using the failover image.

11. The non-transitory computer readable storage medium of claim 9 wherein, upon receiving the request to create the failover image, the replication component is configured to:
   check whether a host heartbeat associated with a host system in the first cluster on which the VM was running is up-to-date;
   if the host heartbeat is up-to-date, check whether the VM is currently powered-on; and
   if the VM is not currently powered on:
      set a failover-in-progress state for the VM;
      create the failover image; and
      upon successful creation of the failover image, unset the failover-in-progress state.

12. The non-transitory computer readable storage medium of claim 11 wherein the VM is not allowed to be powered-on in the first cluster while the failover-in-progress state is set.

13. A computer system executing a VIMS instance, the computer system comprising:
   a processor; and
   a non-transitory computer readable storage medium having stored thereon program code that, when executed by the processor, causes the processor to:
      receive an indication that a VM in a first cluster of the VIMS instance has failed, wherein one or more files of the VM are stored on a first storage component accessible by host systems in the first cluster;
      search for a second cluster of the VIMS instance that has access to the first storage component
      if the second cluster is found, cause the VM to be restarted on a host system in the second cluster; and
      if the second cluster is not found:
         determine whether the one or more files of the VM were being replicated to a second storage component at the time of the VM's failure, wherein the second storage component is accessible by host systems in one or more third clusters of the VIMS instance but is not accessible by the host systems in the first cluster;
         if the one or more files of the VM were being replicated to the second storage component at the time of the VM's failure, identify a host system within the one or more third clusters that is compatible with the VM; and
         cause the VM to be restarted on the identified host system in the one or more third clusters.

14. The computer system of claim 13 wherein the program code further causes the processor to, prior to identifying the host system within the one or more third clusters:
   check a user-defined policy to determine whether automatic recovery of the VM should continue; and
   if the user-defined policy indicates that automatic recovery should not continue, request manual user intervention.

15. The computer system of claim 13 wherein the program code further causes the processor to, prior to identifying the host system within the one or more third clusters:
   send, to a replication component involved in replicating the VM's files, a request to create a failover image for the VM, the failover image including one or more links to a replicated copy of the one or more files of the VM; and
   in response to the sending, receive a path to the failover image.

16. The computer system of claim 15 wherein the processor causes the VM to be restarted on the identified host system using the failover image.

17. The computer system of claim 15 wherein, upon receiving the request to create the failover image, the replication component is configured to:
   check whether a host heartbeat associated with a host system in the first cluster on which the VM was running is up-to-date;
   if the host heartbeat is up-to-date, check whether the VM is currently powered-on; and
   if the VM is not currently powered on:
      set a failover-in-progress state for the VM;
      create the failover image; and
      upon successful creation of the failover image, unset the failover-in-progress state.

18. The computer system of claim 17 wherein the VM is not allowed to be powered-on in the first cluster while the failover-in-progress state is set.

* * * * *